Aug. 10, 1954 V. C. DAVIS 2,686,293
ELECTRICAL MEASURING NETWORK
Filed July 1, 1947

INVENTOR
Vincent C. Davis

BY: *J. H. Adams*
*Walter G. Miller*
ATTORNEYS

Patented Aug. 10, 1954

2,686,293

UNITED STATES PATENT OFFICE 2,686,293

ELECTRICAL MEASURING NETWORK

Vincent C. Davis, Oakland, Calif., assignor to California Research Corporation, San Francisco, Calif., a corporation of Delaware Application July 1, 1947, Serial No. 758,413

10 Claims. (Cl. 324—62)

This invention relates to electrical circuits of the balanced network type and particularly refers to an arrangement in which a plurality of four-terminal networks commonly known as bridges are interconnected by electrically selective isolating means to a single potential or current responsive means for indicating the amount of greatest unbalance of the interconnected bridges.

It is an object of this invention to provide a multiterminal network with provisions for a reference potential which may be a steady or direct current source and any number of pairs of current-conducting elements with each of the junctions between these pairs connected by an asymmetrical conducting element to a potential or current indicating means which is also connected to the reference potential. Provision is made to adjust the impedance or resistance of one element of each of these interconnected pairs in such a manner that the potential difference between the junction of the several pairs is such that the indicating means will be unresponsive until one of the elements in the interconnected pairs changes impedance or resistance, for example, due to a physical change therein, sufficiently to reverse the polarity of the potential impressed upon the asymmetrical element so that it will permit current to flow through the indicating means.

Another object is to provide an electrical circuit with a plurality of pairs of elements, one element of each pair being responsive to physical changes or conditions, such as temperature, position, strain or the like, to modify its electrical property, for example, resistance or impedance, whereby the potential or current indicating means will be actuated by any one of the condition responsive elements.

Another object is to provide an electrical circuit adapted to be connected to a plurality of potential controlling or modifying elements, so constructed and arranged that the greatest potential difference set up in said elements will be indicated upon a single potential or current responsive means.

These and other objects and advantages will be further apparent from the attached drawing which forms a part of this specification and illustrates two basic arrangements, a preferred embodiment of the invention applied to a plurality of temperature indicating circuits, and an alternative arrangement of the latter with a switching means for determining which of the said circuits is exposed to the highest or lowest temperature.

In the drawing, Figure 1 is a connection diagram of a single four-terminal network embodying this invention.

Figures 1, 2:
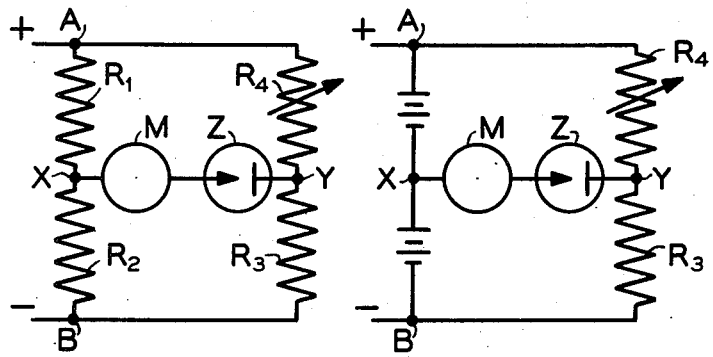
Figure 2 is a diagram of an arrangement similar to that of Figure 1 but with a constant potential source such as batteries replacing the potential dividing resistances of Figure 1.

Referring to the drawing and particularly to Figure 1, reference letters $R_1$, $R_2$, $R_3$ and $R_4$ indicate a conventional bridge arrangement in which a steady potential difference from any suitable source, not shown, is supplied at A and B, and a potential responsive means M, for example, a potentiometer, millivoltmeter, or combination of the two, a vacuum or gaseous discharge tube, or the like, is connected between points X and Y, which are the junctions between $R_1$ and $R_2$, and $R_3$ and $R_4$, respectively. Where the term "potential responsive means" is used in the appended claims it is intended to include means responsive to current flow, such as a milliammeter.

In this embodiment, $R_4$ is designated as being adjustable, and $R_3$ may be of a material having a selected temperature coefficient of resistance, for example, iron, nickel, carbon, or other suitable elements or alloys, so that its resistance will vary according to temperature or other physical conditions, such as mechanical strain. In this invention, as distinguished from conventional practice, an asymmetrical conductor Z, to be referred to as a rectifier, is connected in series with the potential responsive means M. The rectifier may be of any suitable or desired type, for example, a vacuum tube, mineral crystal, metalloid or the like. Rectifier Z has a very low resistance in the direction of conductance and a very high resistance in the opposite direction, and hence serves to selectively control the nature or direction of current and therefore the potential difference which will cause a response of the potential or current indicating means M. For example, if the direction of potential unbalance set up by the ratio of $R_3$ to $R_4$ is in one direction, a current will pass through rectifier Z and impress a potential difference across M which will give an indication of the degree of said unbalance. If the unbalance should be in the opposite direction, rectifier Z would be effective substantially to prevent a current flow and the resulting potential difference across M and no indication of unbalance would be given.

Figure 3:
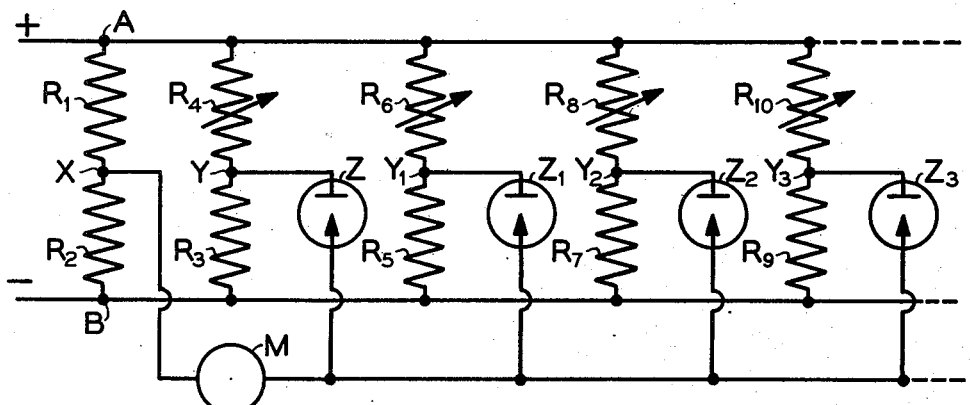
Figure 3 is a connection diagram of an arrangement like that of Figure 1 with the addition of parallel connected pairs of elements actuating a single indicating means.

Referring now to Figure 3 in which corresponding letters and subscripts represent corresponding parts to those just described, it will be noted that additional pairs of resistances or impedances $R_5$ and $R_6$, $R_7$ and $R_8$, $R_9$ and $R_{10}$, have been connected in parallel to the original pair $R_3$ and $R_4$ of the circuit of Figures 1 and 2. The junctions $Y_1$, $Y_2$ and $Y_3$ of the added parallel circuits are connected, respectively, through additional rectifiers $Z_1$, $Z_2$ and $Z_3$ to the common potential or current responsive means M.

In this embodiment, if resistors or impedances $R_4$, $R_6$, $R_8$ and $R_{10}$ are initially adjusted to give various degrees of unbalance but all in the direction that the resulting potential differences between point X and junctions Y, $Y_1$, $Y_2$ and $Y_3$ are of such polarity that rectifiers Z, $Z_1$, $Z_2$ and $Z_3$ have a very high resistance to current flow, then the resistance or impedance of any one of the resistors or impedances $R_3$, $R_5$, $R_7$ or $R_9$ will have to change sufficiently to reverse the direction of potential difference between point X and its junction with its previously adjusted corresponding resistor or impedance before sufficient current will flow through the respective rectifier to actuate the indicating means M. If resistors or impedances $R_3$, $R_5$, $R_7$ and $R_9$ are temperature-sensitive and are subjected to variable temperatures, then resistors or impedances $R_4$, $R_6$, $R_8$ and $R_{10}$ may be calibrated in degrees of temperature and indicating means M will only operate if the temperature of $R_3$, $R_5$, $R_7$ or $R_9$ exceeds the temperature setting or adjustment on its respective corresponding resistor or impedance $R_4$, $R_6$, $R_8$ or $R_{10}$. In this specification the indicating means may include a current controller, such as a relay, a grid-controlled rectifier tube, or any suitable current or potential operated device. Also, where the term "resistance" is used in the appended claims it is intended to include means which will offer impedance, such as an inductance coil.

If desired, indicating means M may be calibrated in degrees of temperature and with $R_3$, $R_5$, $R_7$ and $R_9$ at the temperature indicated when there is no potential across M, then $R_4$, $R_6$, $R_8$ and $R_{10}$ would be adjusted for balance. Indicator M, which might be a D'Arsonval type direct current meter would then register the temperature of the one resistor $R_3$, $R_5$, $R_7$ or $R_9$ that was subjected to the highest temperature. It will be noted that for this mode of operation, if the expected change of temperature is in one direction only, an alternating potential could be applied to terminals A and B of the arrangements of Figures 1, 3 and 4. If M is a direct current indicator having a high internal resistance and is shunted by a large capacitance, the latter will be charged to the peak value of each half cycle when any of the rectifiers Z, $Z_1$, $Z_2$ and $Z_3$ offers a low resistance to current flow and the meter M will then indicate the highest temperature imposed upon resistors $R_3$, $R_5$, $R_7$ or $R_9$.

Figure 4:
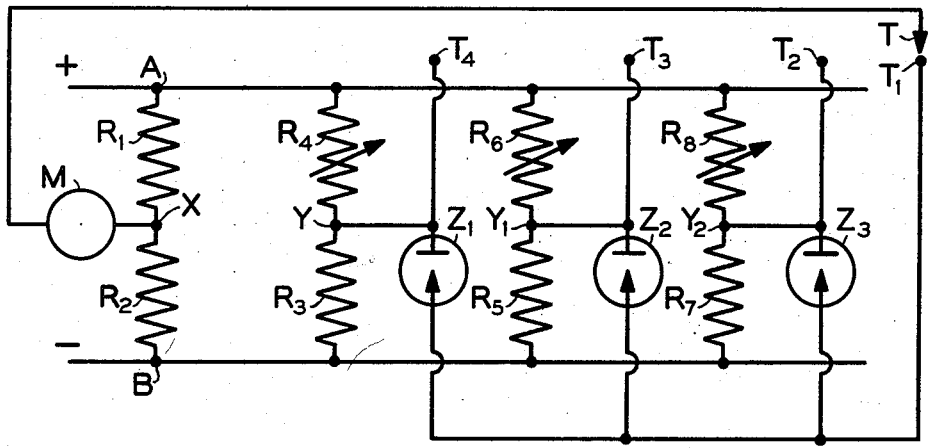
Figure 4 is a connection diagram of an alternative embodiment of the arrangement of Figure 3 with switching means for determining which of the several parallel circuits has the highest degree of unbalance.

The arrangement of Figure 4 is essentially similar to that just described for Figure 3 with the exception of the switching means which is normally connected as shown, with terminal T connected to $T_1$, thus placing the several pairs of resistors or impedances with their respective rectifiers in parallel across the indicating means M. When potential or current responsive means M shows that a degree of unbalance exists, the pair responsible for the indication may be determined by contacting T to terminals $T_2$, $T_3$ and $T_4$ in any desired sequence. In this way each pair of resistors or impedances may be isolated from the other pairs of resistors or impedances and directly connected to M so that the potential responsive means may be connected to the individual pair under observation instead of through the rectifiers $Z_1$, $Z_2$ or $Z_3$ whereby the three pairs of impedances or resistances are in parallel.

In conclusion, it will be appreciated that this invention comprehends broadly an electrical network in which a single potential or current indicating means is selectively responsive to predetermined changes or potential unbalance set up in said network by one or more resistors or impedance elements, each of the latter connected to said indicating means through an asymmetrical conductor or rectifier which will transmit current when the direction of potential difference in said resistances or impedances is in one direction and will offer a high resistance to current flow when said potential difference is in the opposite direction. Desirably, but not necessarily, selective switching means may be provided for connecting said potential indicating means to said resistances or impedances so that the individual circuit in which the unbalance is caused, for example, by a physical change, such as temperature, may be identified.

One principal use of the invention described in the foregoing description is as a safety means for aircraft, to indicate to the pilot or flight engineer when higher than normal temperatures are reached in various parts of the engines, e. g. cylinder heads or in other places in the aircraft, e. g. baggage compartments.

It is obvious that numerous changes and modifications of the networks illustrated could be made without departing from this invention, and all such changes that are included within the scope of the appended claims are embraced thereby.

I claim:

1. An electrical network of the bridge type comprising a potential source, a pair of potential dividing means connected across said potential source, potential responsive means connected to the junction of said dividing means, a plurality of series-connected impedance pairs connected in parallel across said potential source, one of said impedances in each pair being variable in response to a change in physical condition, a rectifier corresponding to each of said impedance pairs and connected between the junctions thereof and said potential responsive means so that last-named means is responsive to an unbalanced potential between the junctions of said dividing means and each of said impedance pairs.

2. A condition responsive electrical network comprising a pair of series-connected resistances and a pair of potential dividing means joined in a four-terminal network to form a bridge, a second pair of series-connected resistances connected in parallel with said first-named pair of resistances, a potential responsive means having a first terminal connected to the junction of said potential dividing means, a first rectifier connecting the second terminal of said potential responsive means to the junction of said first-named series-connected resistances, and a second rectifier connecting the second terminal of said potential responsive means to the junction of said second-named series-connected resistances, at least one resistance of said pairs of resistances being variable in response to the condition to be indicated by said network.

3. An electrical network according to claim 2 with the addition of further pairs of series-connected resistances, each of said pairs connected in parallel with said first-named pair of resistances, each of said further resistance pairs being provided with a rectifier connecting the second terminal of said potential responsive means to the junction of said further pair of resistances, at least one resistance of said further pairs of resistances being variable in response to the condition to be indicated by said network.

4. An electrical network according to claim 2 with the addition of further pairs of series-connected resistances, each of said pairs connected in parallel with said first-named pair of resistances, each of said further resistance pairs being provided with a rectifier connecting the second terminal of said potential responsive means to the junction of said further pairs of resistances, at least one resistance of said further pairs of resistances being variable in response to the condition to be indicated by said network, and switching means for breaking the circuit between said second terminal of said potential responsive means and said rectifiers, and for selectively connecting said second terminal to each of the junctions of said further resistance pairs.

5. An electrical network according to claim 2 in which said potential dividing means comprises a pair of resistances connected in series to provide a junction and with their outer terminals adapted to be connected to a source of direct current electrical potential.

6. An electrical network according to claim 2 in which the other resistance of said pairs of resistances is adjustable to establish a threshold value for said condition-responsive resistance.

7. An electrical network of the bridge type comprising a potential source, a pair of potential dividing means connected across said potential source, potential responsive means connected to the junction of said dividing means, a plurality of series-connected impedance pairs connected in parallel across said potential source, one of said impedances in each pair being variable in response to a change in physical condition and the other impedance being adjustable to permit the threshold value of each impedance pair to be independently variable of the other impedance pairs, a rectifier corresponding to each of said impedance pairs and connected between the junctions thereof and said potential responsive means so that said last-named means is responsive to an unbalanced potential between the junctions of said dividing means and each of said impedance pairs.

8. An electrical network in accordance with claim 7 with the addition of switching means for breaking the connection between said rectifiers and said potential responsive means, and for selectively connecting each of the junctions of said impedance pairs directly to the side of said potential responsive means originally connected to said rectifiers.

9. A condition responsive electrical network comprising a pair of series-connected resistances and a pair of series-connected direct current potential sources joined in a four-terminal network to form a bridge, a second pair of series-connected resistances connected in parallel with said first named pair of resistances, a potential responsive means having a first terminal connected to the junction of said potential sources, a first rectifier connecting the second terminal of said potential responsive means to the junction of said first-named series-connected resistances, and a second rectifier connecting the second terminal of said potential responsive means to the junction of said second-named series-connected resistances, at least one resistance of said pairs of resistances being variable in response to the condition to be indicated by said network.

10. In an electrical bridge network including a source of potential: the combination of three or more potential dividing means connected parallel to each other across said potential source, a potential responsive means, means connecting one side of said potential responsive means to a point of intermediate potential in one of said potential dividing means, and a rectifier for each of the other of said potential dividing means, each of said rectifiers being connected between the other side of said responsive means and a point of intermediate potential in the respective one of said other dividing means, each of said other dividing means being variable to change the potential of its said intermediate point.

References Cited in the file of this patent

UNITED STATES PATENTS

| Number | Name | Date |
|---|---|---|
| 1,363,267 | Porter | Dec. 28, 1920 |
| 2,240,184 | Hathaway | Apr. 29, 1941 |
| 2,246,575 | Coleman | June 24, 1941 |
| 2,276,843 | Hathaway | Mar. 17, 1942 |
| 2,393,669 | Wheaton et al. | Jan. 29, 1946 |
| 2,444,421 | Boston | July 6, 1948 |
| 2,449,304 | Lamb | Sept. 14, 1948 |
| 2,455,654 | Browne | Dec. 7, 1948 |

OTHER REFERENCES

Pp. 624 and 625 of "Electrical Engineering Transactions," E. A. Harty, "Selenium-Rectifier Cells," Oct. 1943, vol. 62.

P. 266 of "Electronic Circuits and Tubes," Cruft Lab., McGraw-Hill, 1947.

P. 952 of "Temperature—Its Measurement and Control," American Institute of Physics, Reinhold, 1947.

Pp. 20 and 21 of "Crystal Rectifiers," Torrey and Whitmer, O. S. R. D., McGraw-Hill, 1948.